US012768385B2

(12) United States Patent
Jodeleit et al.

(10) Patent No.: US 12,768,385 B2
(45) Date of Patent: Oct. 20, 2026

(54) MULTI-PART SOCKET-LIKE CEMENT-IN RETAINER

(71) Applicant: BÖLLHOFF VERBINDUNGSTECHNIK GmbH, Bielefeld (DE)

(72) Inventors: Martin Jodeleit, Bielefeld (DE); Franz Drüke, Detmold (DE); Jörg Matthes, Herford (DE); Peter Meilwes, Altenbeken (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 127 days.

(21) Appl. No.: 18/004,315

(22) PCT Filed: Jun. 24, 2021

(86) PCT No.: PCT/EP2021/067416
§ 371 (c)(1),
(2) Date: Jan. 5, 2023

(87) PCT Pub. No.: WO2022/008262
PCT Pub. Date: Jan. 13, 2022

(65) Prior Publication Data

US 2023/0250841 A1 Aug. 10, 2023

(30) Foreign Application Priority Data

Jul. 7, 2020 (DE) ..................... 10 2020 117 921.9

(51) Int. Cl.
*F16B 5/01* (2006.01)
*F16B 11/00* (2006.01)
(Continued)

(52) U.S. Cl.
CPC .......... *F16B 11/006* (2013.01); *F16B 37/044* (2013.01); *F16B 37/122* (2013.01); *F16B 5/01* (2013.01)

(58) Field of Classification Search
CPC ................................. F16B 5/01; F16B 37/044
See application file for complete search history.

(56) References Cited

U.S. PATENT DOCUMENTS 3,019,865 A * 2/1962 Rohe ......................... F16B 5/01 428/116
4,729,705 A * 3/1988 Higgins ................ F16B 37/122 52/704
(Continued)

FOREIGN PATENT DOCUMENTS

CA 2738737 A1 4/2010
CN 102171463 A 8/2011
(Continued)

OTHER PUBLICATIONS

International Standard—Electrical Insulating Materials—Thermal Endurance Properties—Part 1: Ageing Procedures and Evaluation of Test Results; IEC 60216-1; Mar. 2013 (70 pages).
(Continued)

*Primary Examiner* — Michael P Ferguson
(74) *Attorney, Agent, or Firm* — Reising Ethington P.C.

(57) ABSTRACT

A multipart socket-like glue-in retainer which is fastenable in a component opening in an adhesive manner in a component opening and which is configured in at least two parts and thus in an opening manner in radial direction due to an axial separation, so that only before a gluing-in of the glue-in retainer in a component opening, a functional insert is arrangeable in the glue-in retainer and after the gluing-in of the glue-in retainer in the component opening, the functional insert is retained inseparably in the glue-in retainer.

15 Claims, 6 Drawing Sheets

Figure 1:
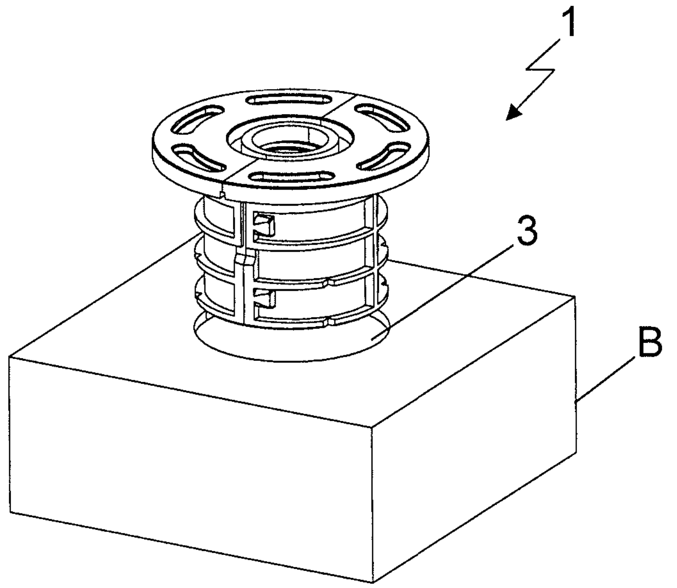

(51) Int. Cl.
*F16B 37/04* (2006.01)
*F16B 37/12* (2006.01)

(56) References Cited

U.S. PATENT DOCUMENTS

| | | | | |
|---|---|---|---|---|
| 4,812,193 | A | 3/1989 | Gauron | |
| 5,378,099 | A * | 1/1995 | Gauron | F16B 5/01<br>411/258 |
| 5,632,582 | A * | 5/1997 | Gauron | F16B 5/01<br>411/258 |
| 7,815,988 | B2 * | 10/2010 | Stumpf | B29C 66/80<br>428/40.9 |
| 9,441,660 | B2 * | 9/2016 | Meyers | B32B 37/146 |
| 9,702,394 | B2 | 7/2017 | Barney et al. | |
| 11,415,165 | B2 | 8/2022 | Reker et al. | |
| 11,644,058 | B2 * | 5/2023 | Wells | F16B 5/01<br>411/103 |
| 2008/0008558 | A1 | 1/2008 | Costabel | |
| 2008/0292425 | A1 * | 11/2008 | Pineiros | F16B 37/044<br>411/92 |

FOREIGN PATENT DOCUMENTS

| | | | |
|---|---|---|---|
| CN | 103097074 | A | 5/2013 |
| DE | 102011009334 | A1 | 8/2011 |
| DE | 102016125664 | A1 | 6/2018 |

OTHER PUBLICATIONS

International Standard—Electrical Insulating Materials—Thermal Endurance Properties—Part 8: Instructions for Calculating Thermal Endurance Characteristics Using Simplified Procedures; IEC 60216-8; Mar. 2013 (42 pages).

Written Opinion & International Search Report for PCT/EP2021/067416 dated Oct. 14, 2021, (15 pages).

English translation of the International Preliminary Report on Patentability for PCT/EP2021/067416 dated Jan. 19, 2023, (10 pages).

CN Office Action for CN Application No. 202180049203.8 dated May 23, 2025, (9 pages).

* cited by examiner

MULTI-PART SOCKET-LIKE CEMENT-IN RETAINER

1. TECHNICAL FIELD

The present disclosure is related to a multipart socket-like cement-in or glue-in retainer, which is fastenable in a component opening in an adhesive manner. The glue-in retainer may be equipped with a functional insert before being glued into the component opening so that the glue-in retainer in combination with the suitable functional insert is usable in different technical situations. Furthermore, the present disclosure includes a component with a component opening in which the above-mentioned glue-in retainer with functional insert is installed. Furthermore, the present disclosure includes an installation method for the glue-in retainer in the component opening as well as a manufacturing method for the glue-in retainer according to the above-described construction.

2. BACKGROUND

In the state of the art, providing fastening possibilities in components which consist of materials which are mechanically little resistant is a general problem. Such components or panels are also referred to as lightweight building panels. According to a material alternative, they consist of a honeycomb material or are generally referred to as honeycomb panels. According to another construction alternative, these lightweight building panels are sandwich panels or panels out of foam material.

Due to the building material, lightweight building panels do not provide sufficient resilience for example for connecting a thread bolt directly with the lightweight building panel. Therefore, holes are often provided in such lightweight building panels into which component inserts are glued in. Such component inserts are for example thread inserts out of metal which are glued into the component opening, which may be a blind bore hole. Such a construction is described in U.S. Pat. No. 4,729,705. In order to fasten the thread insert in the blind bore hole of the lightweight building panel, the blind bore hole is partly filled with adhesive. By inserting the thread insert into the blind bore hole, the adhesive is displaced into the gap between inner wall of the blind bore hole and outer lateral area or surface of the thread insert. This principle of displacement has the disadvantage that not all surfaces of the thread insert as well as of the blind bore hole, which are to be wettened or sprinkled, are wettened or sprinkled with the adhesive in order to achieve a reliable fastening of the thread insert in the blind bore hole. A further disadvantage is that displaced adhesive is pushed out from the blind bore hole, thus affecting the appearance of the glued-in thread insert in the blind bore hole.

DE 10 2011 009 334 A1 describes a fitting system having two fitting parts which are also installable in lightweight building panels. Such fitting systems are used in furniture industry to provide suitable application possibilities for such lightweight building panels. The described fitting parts are equipped with an adhesive on their lateral areas, the adhesive being activatable with heat. For this purpose, the respective fitting part is inserted into a blind bore hole or another suitable opening and rotated there at high speed. Due to the friction between the inner wall of the opening and the outside of the fitting part with adhesive, heat is generated which in turn activates the adhesive on the outside of the fitting part.

A reliable connection between fitting part and inner wall of the component opening is, however, only provided when the inner diameter of the component opening is adapted exactly to the outer diameter of the fitting part, because otherwise, no heat arises which activates the adhesive on the outside of the fitting part. Another disadvantage is that the amount of adhesive for fastening the fitting part in the component opening is not sufficient, provided that the gap between fitting part and inner wall of the component opening is too big. In this case, the adhesive is activated by friction, however, the present amount of adhesive is not sufficient for filling the existing gap between fitting part and component opening.

Furthermore, this document only describes an adapted connection between the two fitting parts which are to be connected. This connection is limited to a force-fit and/or form-fit connection which is similar to a locking plug-in connection. Similar to the above-described thread insert, this leads to the lack in flexibility with respect to the connecting possibilities of these fitting parts, because this connection is each limited to the inner construction which is provided by the respective fitting part for the connecting.

U.S. Pat. No. 4,812,193 also describes a thread insert to be glued-in, for instance for a honeycomb panel. This thread insert is placed in a component opening in order to subsequently inject an adhesive into the gap between thread insert and inner wall of the component opening. This adhesive overflows the thread insert and fills the gap between thread insert and inner wall of the component opening in order to reliably fasten the thread insert in the component opening. In order to lead the adhesive for the purpose of an advantageous wetting/sprinkling of the outer wall of the thread insert, a number of disc-like radial webs is provided. These radial webs extend in circumferential direction, are evenly spaced from one another and form flow recesses into which the adhesive can flow. Adjacent in an axial direction, the radial webs are flattened in a limited section in order to generate overflow portions for the adhesive between the adjacent recesses.

A disadvantage of this adhesive fastening of the thread insert is also guaranteeing that the surface of the thread insert is sufficiently wettened or sprinkled with adhesive in order to achieve a reliable adhesive connection to the component. This sprinkling is hindered in a disadvantageous manner by air pockets which cannot be recognized.

With respect to the above-described state of the art, it is therefore the object of at least some implementations the present disclosure to provide an alternative construction for a glue-in retainer which is fastenable in a component opening in an adhesive manner and with which a reliable connection to a functional part, for example a thread bolt or a similar component, can be established.

3. SUMMARY

The above object is solved by a multipart socket-like cement-in or glue-in retainer, a component with a component opening in which such a glue-in retainer is fastened, an installation method of the glue-in retainer in the component as well as a manufacturing method of the glue-in retainer. Advantageous embodiments and further developments of the present disclosure arise from the following description, the accompanying drawings and the appending claims.

The present disclosure includes a multipart socket-like cement-in or glue-in retainer which is fastenable in a component opening in an adhesive manner and having at least two parts due to an axial separation, which may be a separation in the direction of a longitudinal axis of the glue-in retainer and is thus configured in an opening manner in radial direction, so that only before a gluing-in of the glue-in retainer in the component opening, a functional insert is arrangeable in the glue-in retainer and after the gluing-in of the glue-in retainer in the component opening, the functional insert is retained inseparably in the glue-in retainer.

The glue-in retainer is intended to equip components out of less mechanically loadable materials, such as for example lightweight building panels, honeycomb panels or foam/sandwich panels with a loadable connecting possibility. For this purpose, the glue-in retainer is glued into an opening which is provided in the component, which may be into a blind bore hole. After its adhesive fastening in the component, the glue-in retainer forms a universal basis for a functional element or fastening element that is inserted before the gluing-in, which is inseparably retained in the glue-in retainer after the gluing-in. Thus, on the one hand, the glue-in retainer provides a reliable and mechanically loadable fastening of a functional insert, as for example the fastening element or a connecting component. On the other hand, the glue-in retainer is combinable with a functional insert before the gluing-in according to the requirements of the component bond to be established. That means that a selection of functional inserts is available which are arranged in the same manner in the glue-in retainer before the gluing-in and are inseparably retainable in the component opening after the gluing-in. For this purpose, the glue-in retainer is configured shell-like. This shell can be opened without being destroyed in order to receive the functional insert and can be closed again after the functional insert has been inserted. By that, the glue-in retainer in combination with different functional inserts and fastening or connecting inserts provides a building set so that the glue-in retainer in combination with its functional insert can be adapted to the respective necessary connecting situation of the component.

According to a configuration, the glue-in retainer includes a hollow-cylindrical receiving body with a circumferential lateral area, a closed axial face side and an open axial face side, wherein a circumferentially surrounding fastening collar is arranged adjacent to the open face side.

The glue-in retainer may be formed by a pot-like or hollow-cylindrical receiving body for the functional insert. This pot-like receiving body may be closed on one side in order to guarantee a reliable retention of the functional insert and furthermore to provide an adhesive surface of the glue-in retainer in the component opening. A functional opening is provided opposite to the closed axial face side in order to be able to use the functional insert, which is inseparably retained within the receiving body, or make it accessible. This functional opening is realized by the open axial face side which is arranged opposite to the closed axial face side for the adhesive fastening of the glue-in retainer in the component opening.

While on the one hand, an axial face side of the receiving body may be configured in a closed manner, a circumferentially surrounding fastening collar encompasses the functional opening at the open face side of the receiving body. The fastening collar may be arranged at the open axial end of the receiving body. It extends radially with respect to the lateral area of the receiving body and may be flush with the open face side of the receiving body. In this way, the possibility may be provided that the fastening collar abuts a component surface while the remaining receiving body extends into the component opening. This may provide the possibility that the glue-in retainer cannot be fastened adhesively via the closed axial face side of the receiving body in the component, only, because the underside of the fastening collar, which is adjacent to the component surface also constitutes an adhesive surface so that with the help of an adhesive, a substance-to-substance connection between the underside of the fastening collar and the component surface arranged adjacent to it, a reliable retention of the glue-in retainer in the component opening can be achieved.

According to a further embodiment, the receiving body may be separated due to at least one axial cut in longitudinal direction of the glue-in retainer into at least two parts which are moveable relatively with respect to one another, which may be offsetable by being opened, wherein the parts are completely or partly releasable from one another.

According to a construction of the receiving body, the same does not provide a self-contained pot-like body. Rather, the pot-like receiving body may be configured in a separate manner in its longitudinal direction. This separation into at least two parts, which may be two halves, guarantees an opening of the receiving body for receiving the functional insert and a subsequent closing so that the functional insert is inseparably retained within the receiving body and thus within the glue-in retainer.

Accordingly, the receiving body may provide a shell construction which may be opened and closed functionally. With its outer surface, which may be the circumferential lateral surface of the receiving body, this multipart shell construction may provide a fastening surface and/or fastening construction for the adhesive fastening of the receiving body in the component opening. The inner side of the multipart shell construction serves for the reliable retention of the functional insert after the shell construction has been closed again. For this purpose, the shell construction may have a design at its inside which guarantees a form fit with the functional insert to be received and retained after the receiving body has been closed again.

According to different configurations of the multipart receiving body, the at least one axial cut separates the receiving body into two or more parts which are movable relatively to one another. According to a configuration, these parts which are movable to one another are configured completely separately from one another. According to a further configuration, the at least two parts are connected with one another at selected connecting points such that the several parts of the receiving body can be opened so far that the functional insert is arrangeable inside of the receiving body and subsequently, the receiving body can be closed again.

According to a configuration, the receiving body may be made of two half shells which can be released from one another and can be connected again.

According to a configuration, connecting surfaces of the several parts of the receiving body are provided along the axial cut which are arranged opposite to one another and comprise positioning aids and/or connecting aids of the parts. The connecting surfaces of the several parts of the receiving body include, for example, pins on one half of the receiving body which engage correspondingly arranged recesses of the other half of the receiving body. This form fit connection may be combined with a latching connection.

According to a further alternative, the several parts of the receiving body are connected with a film hinge on at least one side. Such a film hinge enables the movability, i.e. an unfolding or opening of the receiving body around the film hinge so that the functional insert is insertable into the receiving body.

According to a further configuration, the parts of the receiving body which are adjacent to one another are movably connected with one another via the above-mentioned film hinge and/or a snap-connection and/or plug connection.

According to a further embodiment, the lateral area of the glue-in retainer comprises an outside which leads or guides the flow, the outside being adapted to a guidance of a flowing adhesive as well as a functional inside with which the functional insert is retainable in the closed receiving body in a form-fit manner.

The functional inside of the receiving body may be designed to form a form-fit connection with the functional insert to be received and retained. For this purpose, tongue and groove connections are used, wherein either, the functional inside includes a circumferential recess as the groove which is engaged by a collar that projects radially from the functional insert. In the same way, such a collar may be provided at the functional inside of the receiving body which engages a corresponding groove at the functional insert.

If such a collar extends perpendicularly to the longitudinal axis of the receiving body, the functional insert is fixedly arranged in axial direction within the receiving body by means of the tongue and groove connection. At the same time, such a connection also allows the functional insert to be arranged perpendicularly to the longitudinal axis of the receiving body in a firm or swimming/floating manner. The swimming/floating arrangement provides the possibility that a certain tolerance compensation can be provided when using the functional insert. This is relevant for example when the functional insert constitutes a thread insert or a coupling receiving into which a thread bolt must be screwed in in a matching manner in terms of alignment or into which a coupling bolt must be inserted.

Projecting webs of different alignment may be arranged at the flow-guiding outside. These webs form boundaries for surfaces or channels which are arranged in a recessed manner, in which an adhesive that is flowing around the receiving body is received and guided. Furthermore, such webs may be provided with recesses so that an overflowing of the webs is guaranteed.

According to a further configuration, the functional inside of the receiving body includes a circumferential retaining groove which may be adapted to a circumferential collar of the functional insert in terms of a width and a depth in order to hold same firmly or swimmingly/floatingly within the receiving cavity (see above).

According to a further configuration, the fastening collar of the glue-in retainer includes a number of irradiation sections in which a thickness of the fastening collar in longitudinal direction of the glue-in retainer is reduced in order to provide the fastening collar in the irradiation sections such that it may be shone through with light.

According to a configuration, the glue-in retainer may be fastened between the component surface and the adjacent underside of the fastening collar with the help of an adhesive. In order to activate and/or cure this adhesive, the adhesive is irradiated with light of a specific wavelength. However, as for aesthetic reasons, the fastening collar may cover the adhesive connection to the component surface, the amount of adhesive below the fastening collar could not be reached for a light irradiation. The irradiation sections may be provided. Due to their thickness, they can be irradiated with light so that the necessary light intensity penetrates the irradiation portions, hit the adhesive and activate and/or cure the same.

According to a further configuration of the glue-in retainer, a blocking web may be provided within the receiving body at the closed axial face side, wherein the blocking web is receivable in a blocking groove of the functional insert so that a relative rotation between the functional insert and the receiving body is prevented.

According to a further embodiment of the glue-in retainer, the functional insert may be a sleeve that is closed on one side having a circumferential collar and an inner thread or a planar inner wall, a spring clip for a quick lock, a ball socket with a circumferential collar or a projecting thread pin or a ball bolt.

According to a further embodiment of the glue-in retainer, the hollow cylindrical receiving body has an inner thread at a circumferential inner wall in which a wire thread insert is arranged as a functional insert.

In the same way, to arrange a hollow cylindrical functional insert within the receiving body, having an inner thread at its inside with a wire thread insert may be arranged therein. In contrast to the above described alternative, the functional insert with inner thread and wire thread insert provides a swimming/floating support in the receiving body in order to be able to compensate possible tolerances when screwing a thread bolt into the inner thread with wire thread insert.

With regard to the above-described configuration alternatives, the glue-in retainer and/or the functional insert may consist of a thermoplastic plastic material with a permanent usage temperature of at least 130° C. This material selection may guarantee the use of the present disclosure in aviation technology.

Alternatively to the above material selection, common plastic materials of household appliances, the automotive industry or other sectors may be used. Accordingly, polyamides and similar plastic materials are used.

Furthermore, the present disclosure includes a component with a component opening, which may be a blind bore hole in which a glue-in retainer according to one of the above-described configurations may be glued in.

Furthermore, the present disclosure includes an installation method of a glue-in retainer according to one of the above-described configurations in a component. The installation method includes the following steps: providing a component with a blind bore hole in which the glue-in retainer is receivable, arranging a functional insert in the glue-in retainer so that the functional insert is retained inseparably in the glue-in retainer, and subsequently, gluing-in the glue-in retainer in the blind bore hole.

In a configuration of the installation method, an applying of a first adhesive amount to a bottom of the blind bore hole, an inserting of the glue-in retainer with functional insert in the blind bore hole with the first adhesive amount and a curing of the adhesive may take place in a further step.

Moreover, a second adhesive amount may be applied between the circumferential face-sided axial collar of the glue-in retainer and the component and which may be to cure it there.

The different configurations of the installation method provide the possibility to adhesively fasten the glue-in retainer in different ways in the component opening. According to an alternative, the component opening is partly filled with adhesive and due to the inserting of the glue-in retainer, the adhesive is displaced into the gap between the inner wall of the component opening and the outside of the glue-in retainer. The curing of the adhesive which takes place there fastens the glue-in retainer in the component opening.

According to a configuration, the glue-in retainer may also be fastened at the bottom of the component opening by applying only one adhesive amount. The closed axial face side of the glue-in retainer hits on this adhesive amount while the glue-in retainer is inserted into the component opening. In this way, the adhesive amount is displaced into the gap between inner wall of the component opening and outside of the glue-in retainer. The amount of adhesive may be chosen sufficiently small so that only the closed axial face side and the opposite surface of the component opening as well as the outer wall of the glue-in retainer is sprinkled or wettened with the adhesive up to no more than half of the axial length of the glue-in retainer. In this way, it is avoided that too much adhesive is displaced out of the component opening during the inserting of the glue-in retainer, thus destroying the aesthetic appearance of the component.

According to a further configuration, the glue-in retainer may be specifically fastened in the component opening with the applying of at least two amounts of adhesive. For this purpose, a first adhesive amount is applied to the bottom of the blind bore hole so that an adhesive connection between the closed axial face side of the glue-in retainer and the ground of the blind bore hole can be established. A second adhesive amount may be applied below the fastening collar. In this way, a second adhesive connection is established between the underside of the fastening collar and the component surface opposite to it.

According to a further configuration of the installation method, the glue-in retainer may be fastened with two different adhesives which comply with different curing principles.

An adhesive may be applied to the bottom of the blind bore hole which cures over time without any specific activation. Furthermore, an adhesive may be applied which is firstly activated by irradiating light so as to cure in the following time. For this purpose, it is for example conceivable to apply the adhesive in the blind bore hole, then, light is irradiated for the activation and only then is the glue-in retainer inserted into the blind bore hole with adhesive. According to a further alternative of the installation method, the applied adhesive may cure in the blind bore hole by irradiating heat.

A light-activatable and/or a light-curing adhesive may be provided below the fastening collar. Because with the help of the above-described irradiation portions in the fastening collar, it may be possible to activate the amount of adhesive between the bottom side of the fastening collar and the component surface by means of light irradiation. In the same way, between the underside of the fastening collar and the surface of the component, an adhesive which cures by heat or an adhesive which cures over time may be provided. In case an adhesive which cures by heat is used, the manufactured adhesive location is heated sufficiently in order to support the curing process.

Furthermore, the present disclosure comprises a manufacturing method for the glue-in retainer according to the above-described configurations. The manufacturing methods include the following steps: providing a first injection mold which is configured complimentary with respect to the form of the glue-in retainer, injection-molding of the glue-in retainer in the first injection mold and of the functional insert in the second injection mold and demolding the glue-in retainer.

According to a further configuration of the manufacturing method, the additional steps may be intended: providing a second injection mold which is configured complimentary to the form of the functional insert, injection-molding the functional insert in the second injection mold and demolding the functional insert. Alternatively to that, a prefabricated functional insert may be provided.

The glue-in retainer and/or the functional insert may be manufactured from a thermoplastic plastic material with a permanent usage temperature of at least 130° C.

4. BRIEF DESCRIPTION OF THE DRAWINGS

Figure 2:
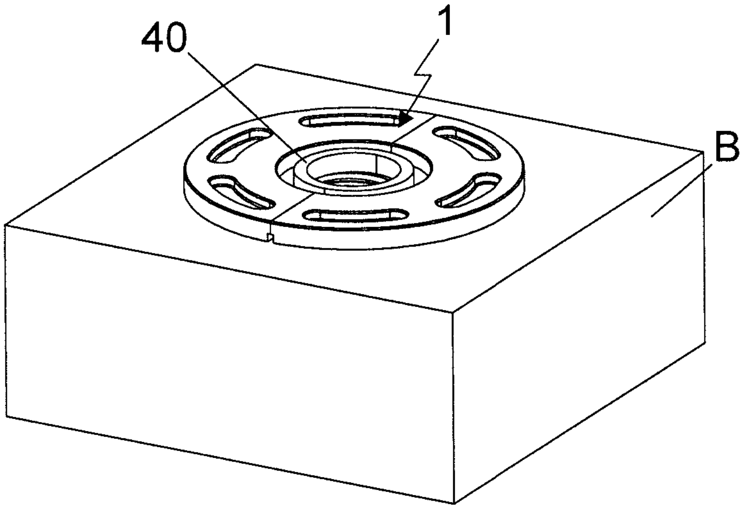
Figure 3:
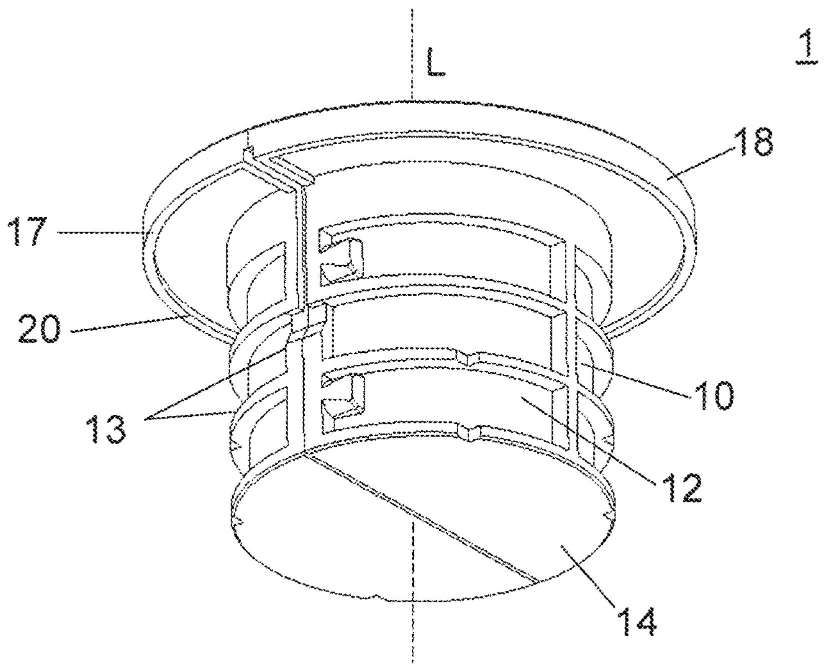
Figure 4:
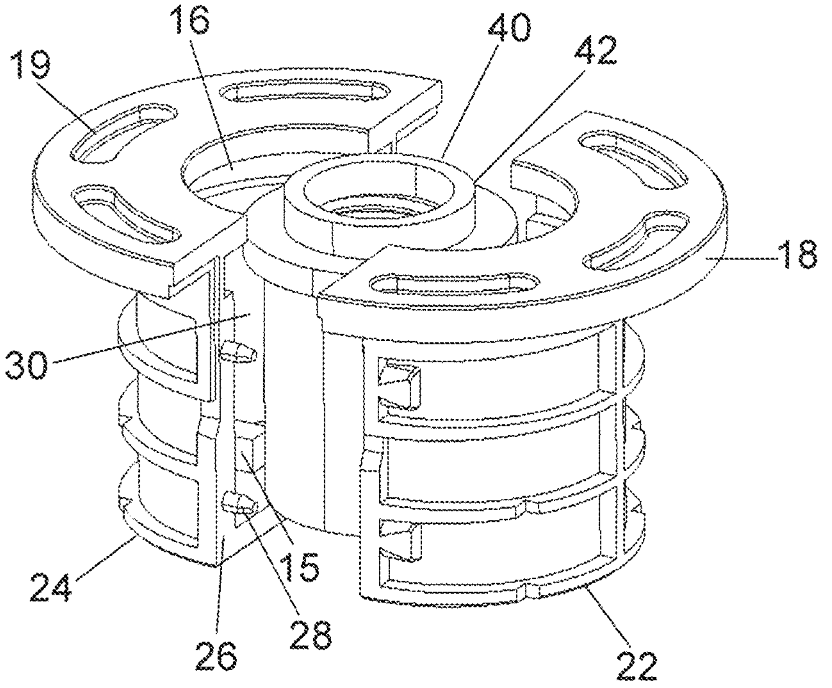
Figures 5A, 5B, 5C, 5D:
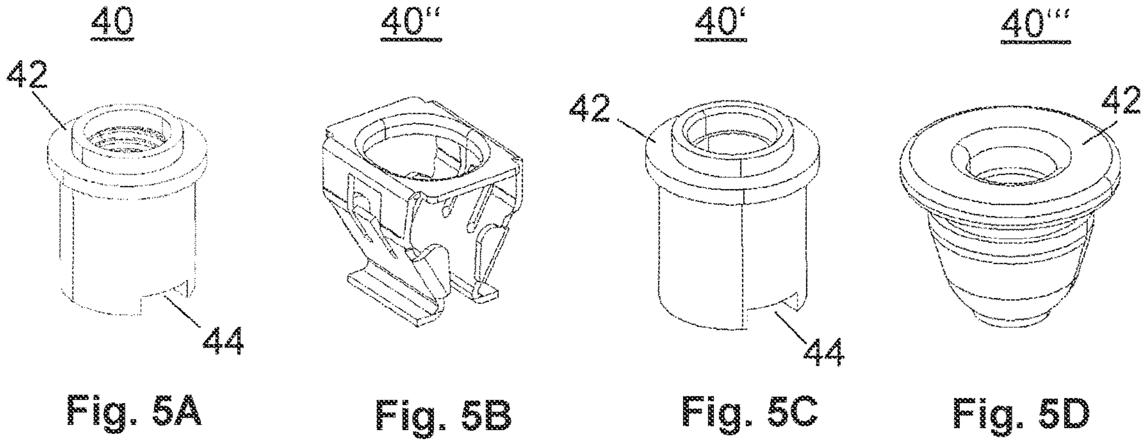
Figure 6:
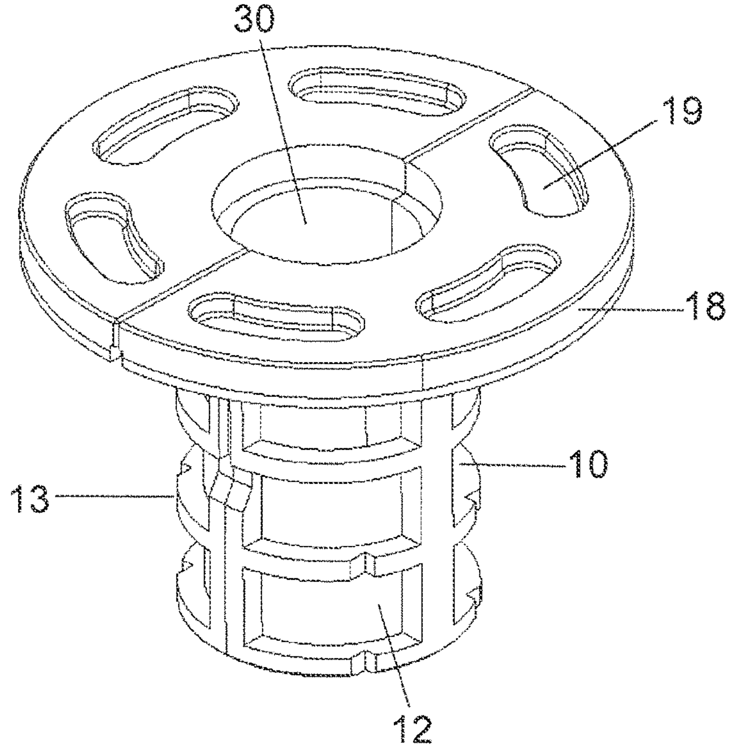
Figure 7:
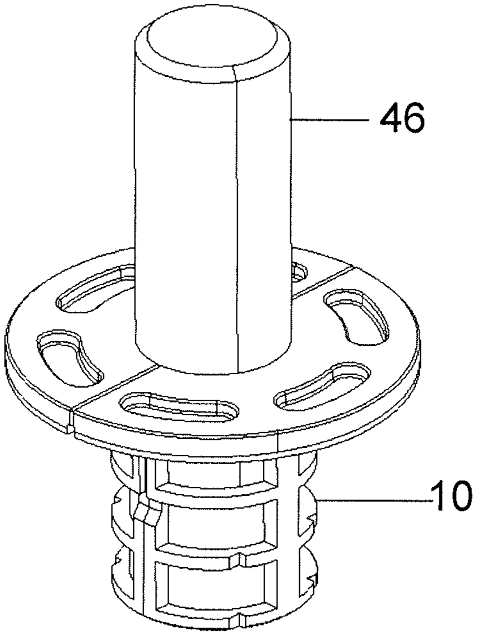
Figure 8:
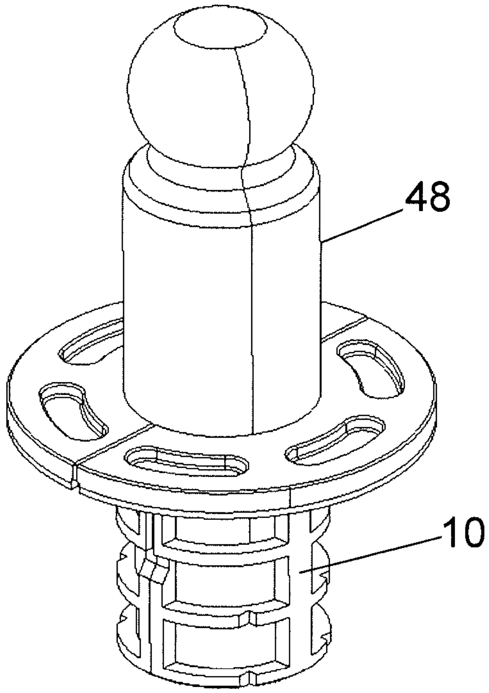
Figure 9:
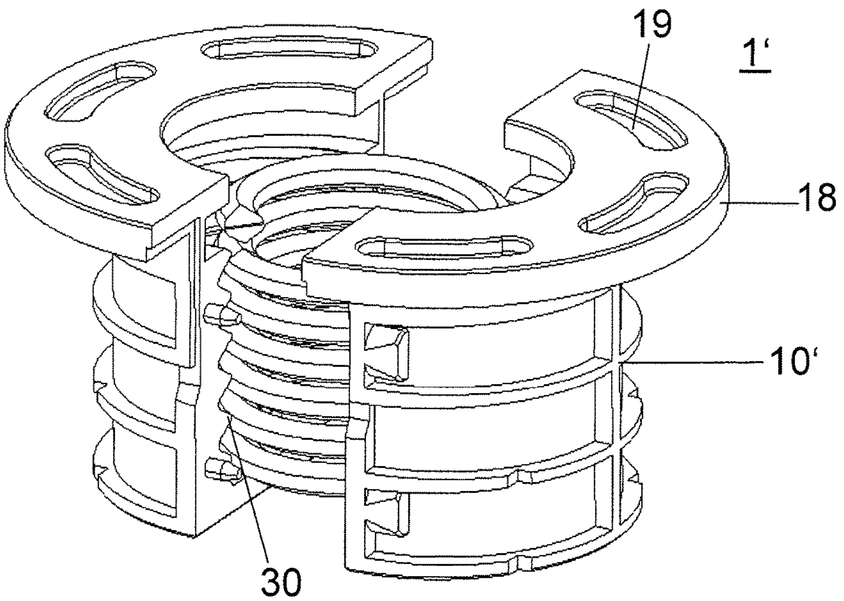
Figure 10:
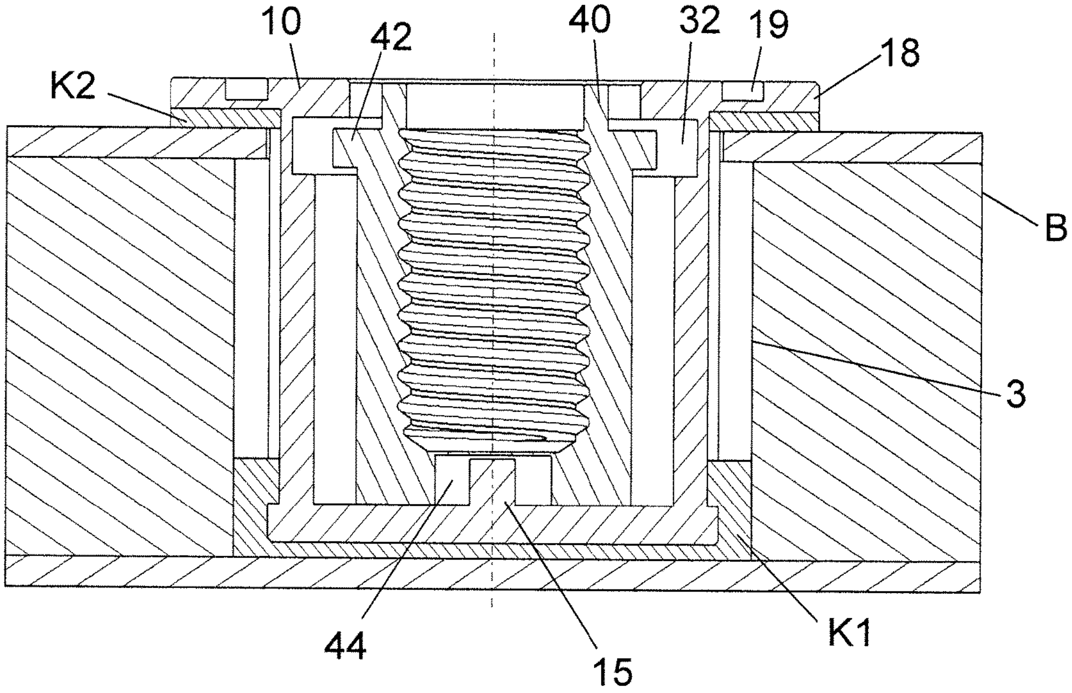
Figure 11:
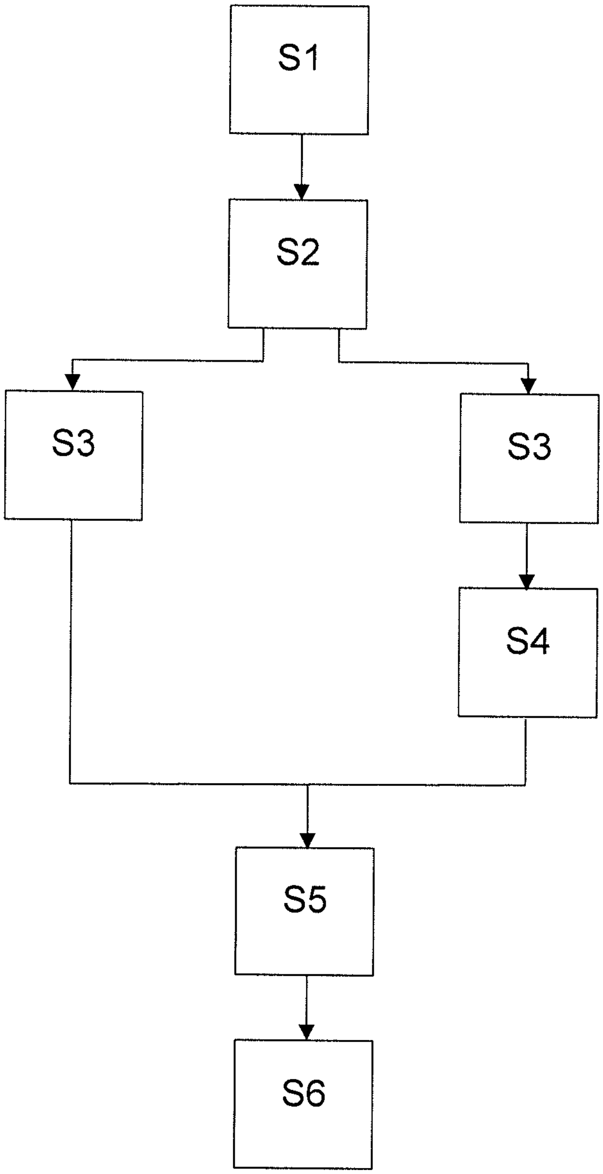

The embodiments of the present disclosure are described with respect to the accompanying drawings in more detail. They show:

FIG. 1 a schematic illustration of a component with a bore hole into which a configuration of the glue-in retainer is supposed to be inserted, FIG. 2 a schematically illustrated component with a component opening in which a configuration of the glue-in retainer with a functional insert is fastened, FIG. 3 a perspective lateral view of a configuration of the glue-in retainer, FIG. 4 an exploded view of the glue-in retainer according to FIG. 3 with an embodiment of a functional insert arranged in there, FIGS. 5A, 5B, 5C and 5D different configurations of the functional insert, FIG. 6 a further configuration of the glue-in retainer, FIG. 7 a further configuration of the glue-in retainer with a thread bolt as functional insert, FIG. 8 a further embodiment of the glue-in retainer with a ball bolt as functional insert, FIG. 9 a further configuration of the glue-in retainer in an exploded view with an inner thread and a wire thread insert to be arranged in there, FIG. 10 a schematic sectional view of a glue-in retainer that is glued into the component opening, and FIG. 11 a flow chart of a configuration of the installation method.

5. DETAILED DESCRIPTION

FIG. 1 shows a schematic illustration of a component B with a component opening 3, before a multipart socket-like glue-in retainer 1 is glued in there. The glue-in retainer 1, which is described in more detail below, is for example suitable for components B of low mechanical inherent stability compared to metal or wood, as for example lightweight panels, sandwich panels, honeycomb panels, foam panels and combinations thereof. Nevertheless, the glue-in retainer 1 may be fastened in components B of any materials.

The glue-in retainer 1 may be manufactured out of plastic material such as an injection molded part. Alternatively, the glue-in retainer 1 may be manufactured with known additive manufacturing methods. This will also offer the possibility to provide the glue-in retainer 1 out of metal, e.g. by means of laser sintering.

According to a configuration, the glue-in retainer 1 and also a functional insert 40 that may be held in there is made of a thermoplastic plastic material with a permanent temperature of use of at least 130° C., which may be a high-performance plastic material. High performance plastic materials may be used in the aviation industry.

The term high performance plastic material or high-performance thermoplastic is based on an application related engineer technology categorization of thermoplastic plastic materials which distinguishes between standard plastic materials, technical plastic materials and high-performance plastic materials. As the name already indicates, high performance plastic materials fulfil higher requirements than standard and technical plastic materials. They may have better mechanical features, a higher resistance towards chemicals and/or a higher resistance towards heat. Thus, they are very different to technical plastic materials which may cover a broad range of functions.

All high-performance plastic materials contain aromatic structures. As the aromatic carbon hydrogen bond is significantly more stable than the aliphatic carbon hydrogen bond, the radical formation which arises during a thermal decomposition or fire becomes more difficult due to the oxidation resistance. Furthermore, the chain stiffness of aromatic polymers is bigger than that of aliphatic polymers, which reduces the glass transmission temperature or, in case of crystalline polymers, increases the crystallite melting point and reduces solubility. Therefore, aromatic structures combine the two most important features for the resistance against high temperatures. The thermal stability is therefore a central feature of high-performance plastic materials.

Based on the features of standard plastic materials, mechanical and thermal improvements can already be achieved by adding reinforcing materials such as glass fibers and carbon fibers, by supplementing stabilizers and by an increase in the degree of polymerization. The permanent temperature of use of at least 130° C. is, however, only achieved when aliphatic units are replaced by aromatic units. In this context, the term permanent temperature of use refers to the maximum temperature at which the respective plastic material has lost no more than 50% of its initial features in hot air after 20,000 hours of storage. In this regard, additional reference is made to DIN IEC 216 as well as DIN EN 60216.

A higher permanent temperature of use can be reached by completely doing without aliphatic elements and by a tight connection of aromatic compounds by functional groups such as ether groups, sulfone groups or imide groups, so that permanent temperatures of use of at least 200° C. to at least 260° C. can be reached. In a further embodiment, the thermoplastic plastic material therefore may have a permanent temperature of use of at least 150° C., or of at least 170° C. and in some embodiments of at least 190° C. In addition or alternatively, the thermoplastic plastic material may be selected from the group of amorph plastic materials. In this context, amorph is generally the term for the state of a solid material in which the components, that is atoms, ions or molecules, are not periodically arranged over a larger portion, the so-called long-range order. The amorph thermoplastic plastic materials are transparent in the initial form. In addition, a component of an amorph thermoplastic plastic material is rigid compared with semi-crystalline thermoplastic high performance plastic materials. A disadvantage compared with the semi-crystalline plastic materials is, however, that it has a lower chemical resistance.

The glue-in retainer 1 is fastened in a substance-to-substance manner by means of an adhesive in the component opening 3. Due to the construction of the glue-in retainer 1 that is described in more detail below, the functional insert 40 is arranged in the adhesive retainer 1 before the glue-in retainer 1 is glued into the component opening 3. After gluing in the glue-in retainer 1 with the functional insert 40 into the component opening 3, it is no longer possible to remove the functional insert 40 from the glue-in retainer 1 or to exchange it by another functional insert 40. Accordingly, FIG. 2 shows a schematic illustration of the glue-in retainer 1 with functional insert 40, which is fastened in the component opening 3 of the component B.

The glue-in retainer 1 is configured multi-part and socket-like. The term socket-like means that the functional insert 40 can be arranged and retained in the glue-in retainer 1.

Based on FIGS. 3 and 4, the construction of the glue-in retainer 1 is explained in more detail. The glue-in retainer 1 has a pot-like receiving body 10. It is configured partly hollow-cylindrical in order to receive and permanently hold the functional insert 40.

The receiving body 10, which extends along the longitudinal axis L, for the functional insert 40 has a circumferential lateral area 12, a closed axial face side 14 and an open axial face side 16.

The open face side 16 may be encompassed by a circumferentially surrounding fastening collar 18. According to the shown configuration, the fastening collar 18 may be configured closed entirely circumferential. The fastening collar 18 may be provided with breakthroughs in axial direction (not shown).

The fastening collar 18 has a plurality of evenly distributed recesses 19, which may be along its side that faces away from the component. Within the recesses 19, the thickness of the fastening collar 18 in the direction of the longitudinal axis L is reduced so much that a bottom of the recess 19 can be irradiated with light. Thus, the recesses 19 serve as an irradiation window in order to activate and/or cure an adhesive that is located at the side of the fastening collar 18 which faces the component.

Similarly, the fastening collar 18 may be provided without the recesses 19.

A circumferentially surrounding web 17, projecting in axial direction, may be provided at the side of the fastening collar 18 which faces the component. The web 17 delimits a channel at the component-facing side of the fastening collar 18 in which the adhesive can be received. The web 17 may prevent a displacing of adhesive radially to the outside beyond the radial extension of the fastening collar 18.

The lateral area 12 includes a plurality of radially outwardly projecting webs 13, extending parallel and perpendicular to the longitudinal axis L. The webs 13 delimit flow tracks for the adhesive, with which the glue-in retainer 1 is fastened in the component opening 3. The webs 13 may be open at a plurality of locations in order to form overflow locations for the adhesive between adjacent flow tracks. Furthermore, the webs 13 may also serve for a ventilation of the adhesive area. That means that air pockets at the adhesive location are avoided as far as possible when the glue-in retainer 1 is glued into the blind bore hole 3.

Based on FIGS. 3 and 4, one will recognize the socket-like or pot-like shape of the receiving body 10. According to a further embodiment, the receiving body 10 may be configured at least two-part due to at least one axial cut 20. According to an embodiment, the receiving body is made of exactly two parts 22, 24, which may be of two halves 22, 24 or half shells of the receiving body 20.

The two halves 22, 24 of the receiving body 20 each include a connecting surface 26 which has been generated by the axial cut 20. These connecting surfaces 26 are arranged opposite one another and abut one another when the receiving body 10 is closed or is fastened in the component opening 3, which may be a blind bore hole. A surface normal of the connecting surface 26 may be aligned perpendicular to the longitudinal axis L.

In order to arrange the two halves 22, 24 reliably and in a way that they are aligned opposite one another, the connecting surfaces 26 may comprise positioning aids 28 and/or connecting aids. According to one configuration, the positioning aid and/or connecting aid 28 is a pin which engages into a matching opening. Likewise, a snapping or locking connection may be provided at this location.

The two halves 22, 24 may have the same construction, so that the manufacturing process and the later assembly becomes more effective.

According to a further configuration, the two halves 22, 24 may be movably connected with one another via a film hinge. Movable means that the receiving body 10 of FIG. 3 may be unfolded in contrast to that of FIG. 4 so as to insert the functional insert 40. According to different configurations, the film hinge (not shown) may be arranged on the radial outside at the fastening collar 18 or on the bottom of the receiving body 10. The corresponding positioning of the film hinge would guarantee an opening of the receiving body 10 for receiving/inserting the functional insert 40 and subsequently closing the receiving body 10. The film hinge may be realized in the construction of the below described blocking web 15.

The receiving body 10 may be divided into more than two parts 22, 24 by means of axial cuts 20, so as to be able to insert the functional insert 40.

The receiving body 10 includes a functional inside 30 which is arranged opposite to the surrounding lateral area 12. The functional inside 30 serves for the fastening and the retaining of the functional insert 40 inside of the receiving body 10. According to a first configuration (see FIG. 4), the functional inside 30 may include at least one circumferential groove 32 or recess in which a suitably configured radial collar 42 of the functional insert 40 can be received. The groove 32 may be configured in a completely surrounding manner. The groove 32 may be interrupted at least at one position by a blocking web (not shown) which projects from the functional inside 30. The blocking web engages into a suitable recess (not shown) in the radial collar 42 in order to provide an anti-rotation security of the functional insert 40 in the receiving body 10 in this way.

The circumferential groove 32 and the radial collar 42 which engages there may be adjusted to one another in terms of their dimensions. According to a further configuration, the radial collar 42 may be provided such that its size exactly fits the groove 32, so that the radial collar 42 and thus the functional insert 40 are firmly held in the groove 32. Due to this connection, neither a radial nor an axial displacement of the functional insert 40 within the receiving body 10 is possible.

According to another configuration, the groove 32 and the radial collar 42 are configured such that the functional insert 40 may be retained at a fixed axial position in the receiving body 10. At the same time, it is, however, also possible that the radial collar 42 and thus the functional insert 40 move radially in the groove 32. In this way, a swimming/floating support of the functional insert 40 in the receiving body 10 is realized.

It is to be understood that the radial collar can also be arranged at the functional inside 30. In this case, the outside of the functional insert 40 comprises the suitably formed groove for receiving the radial collar.

A blocking web 15 may be provided at an inside of the closed face side 14. The blocking web 15 projects in axial direction from the inside of the closed face side 14 and may be arranged eccentrically with respect to the face side 14. The blocking web 15 may extend in the radial direction, as is for example shown in FIG. 4. For this purpose, the blocking web 15 engages a matching recess 44 at the functional insert 40 in order to prevent a relative rotation between the receiving body 10 and the functional insert 40. If the functional insert 40 is held in the receiving body 10 in a swimming/floating manner, the blocking web 15 engages into the recess 44 with a play. Accordingly, the recess 44 is configured wider than the blocking web, as is shown in FIG. 11. In case of a firm arrangement of the functional insert 40 in the receiving body 10, there may be no play between blocking web 15 and recess 44.

FIG. 5 shows a selection of functional inserts 40 which may be arranged swimmingly/floatingly and may be held in the receiving body 10. The functional insert 40 in FIG. 5A includes an inner thread which may be equipped with a thread reinforcing wire thread insert.

The functional insert 40" in FIG. 5B is a spring clamp for a fast lock or a locking connection.

The functional insert 40' in FIG. 5C has a plane inner wall in order to screw in a self-tapping screw.

The functional insert 40'" in FIG. 5D may be a ball socket, i.e. a coupling receiving, in order to hold a ball bolt in there in a releasable manner.

In FIGS. 6 to 8, further embodiments are shown, in which the function insert 40 is retained firmly, i.e. without swimming/floating support, in the receiving body 10. For this purpose, the functional insert 40 in FIG. 6 may include an inner thread with or without reinforcing wire thread insert. In FIG. 7, the functional insert 40 comprises, beside its preferred and non-recognizable holding structure out of radial collar 42 and recess 44 in the receiving body 10, a thread bolt 46 projecting beyond the receiving body 10. Instead of the thread bolt 46, the embodiment in FIG. 8 shows a coupling bolt 48, which may be a ball bolt.

A further embodiment of the present disclosure is shown in FIG. 9. A thread may be provided in the receiving body 10 in the functional inside 30. As functional insert 40"" a wire thread insert may be arranged in the thread. In this context, the multipart construction of the receiving body 10 has proven advantageous because by that, the wire thread insert may be pre-positioned in the opened condition of the receiving body 10 in the thread (see FIG. 9) and be firmly arranged in the thread by closing the receiving body 10.

In a schematic sectional view, FIG. 10 shows the glue-in retainer 1 with the functional insert 40 that is fastened in an adhesive manner in the component opening 3.

Before this state has been reached, the component B with the component opening 3, which may be a blind bore hole, is provided in step S1.

Subsequently to or already before the installation method, the receiving body 10 is opened and a functional insert 40 according to a desired configuration is arranged in the receiving body 10. Subsequently, the receiving body 10 is closed again in order to retain the functional insert 40 in there inseparably (step S2). The opening and closing of the receiving body 10 may take place by means of the above-described film hinge. Alternatively to that, the receiving body 10 is disassembled into two halves or other individual parts and reassembled after positioning the functional insert.

According to a first installation variant, a first adhesive amount K1 is applied to the bottom of the blind bore hole 3 (step S3).

In the following, the glue-in retainer 1 with the functional insert 40 is inserted into the blind bore hole 3 in step S5. As the glue-in retainer 1 dives into the first amount of adhesive K1, the first amount of adhesive K1 is thereby displaced into the gap between the inner wall of the blind bore hole 3 and the lateral area 12 of the glue-in retainer 1. If the amount of the first adhesive amount K1 is big enough, the first adhesive amount K1 is distributed up to under the fastening collar 18. Subsequently, the first adhesive amount K1 is cured in step S6.

The curing of the first adhesive amount K1 may take place by means of heat or passage of time of a known curing time.

An adhesive may be used which can be activated and/or cured by light. In this case, light may be shone in through the irradiation windows 19 or directly through the fastening collar 18 on the first amount of adhesive K1 under the fastening collar 18 and its activation and/or curing is started.

According to a further installation route, the first amount of adhesive K1 may be applied to the bottom of the blind bore hole 3 (step S3). The first amount of adhesive K1 may be limited in terms of its volume such that it sprinkles or wets no more than the gap between the inner wall of the blind bore hole 3 and the lateral area 12. Accordingly, the first amount of adhesive K1 does not reach the component surface below the fastening collar 18.

In a further step S4, a second amount of adhesive K2 may be applied adjacent to the opening of the blind bore hole 3, which will be covered by the fastening collar 18.

Subsequently, the glue-in retainer 1 is inserted into the blind bore hole 3 (step S5) and the first K1 and the second amount of adhesive K2 are cured (step S6).

According to a configuration of the installation method, the adhesive types of the first K1 and of the second adhesive amount K2 may be different. That means that the second adhesive amount K2 comprises an adhesive which can be activated and/or cured by light. Accordingly, light of an adhesive-specific wavelength is shone on the second adhesive amount K2 under the fastening collar 18 via the irradiation windows 19 in the fastening collar 18 after inserting the glue-in retainer 1 into the blind bore hole 3. By that, the second adhesive amount K2 is activated or is activated and cured. This may provide the possibility to pre-fix the glue-in retainer 1 in the blind bore hole 3 via the fastening collar 18 and the light-activated second adhesive amount K2.

The first adhesive amount K1 comprises an adhesive which may cure by heat. Accordingly, a curing amount of heat is delivered to the blind bore hole 3 with pre-fixed glue-in retainer 1 in order to cure the first adhesive amount K1.

An adhesive which cures independently over time may be used as the adhesive of the first adhesive amount K1. With the help of the second adhesive amount K2, the above-described pre-fixation provides for a reliable positioning and the necessary retention of the glue-in retainer 1 with functional insert 40 in the component opening 3 during the curing period of the first adhesive amount K1.

According to the embodiment as shown in FIG. 10, the glue-in retainer 1 may be glued into the blind bore hole 3 of a sandwich panel B. In the sandwich panel B of the known construction, a honeycomb panel or a honeycomb core is for example arranged between the upper and the lower surface layer. The surface layers are more stable than the honeycomb panels and are glued together with the honeycomb panel in order to achieve a stable and mechanically more loadable panel construction.

The glued-in glue-in retainer 1 in the sandwich panel B may be glued together with both surface layers. In this way, an additional structural coupling between the surface layers is established. By that, the glue-in retainer 1 is held via those components of the sandwich panel B that are structurally most stable, which leads to the necessary stability. Furthermore, mechanical forces can be dissipated to both surface layers which leads to a stabilization of the sandwich panel.

Instead of a sandwich panel, the glue-in retainer 1 may be glued into a blind bore hole 3 of a component B out of plastic material or wood or metal or a similar material as solid material or multi-layer structure. This takes place with one or two kinds of adhesive and/or amounts of adhesive, as has been explained above.

In order to manufacture the glue-in retainer according to its configurations, one refers back to known manufacturing methods, like the injection-molding or additive manufacturing methods such as the 3D print or laser sintering. As an example, the manufacturing steps are summarized based on the injection molding method. Firstly, a first injection mold that is configured complementary to the shape of the glue-in retainer 1, which may be to the receiving body 10, and a second injection mold that may be configured complimentary to the form of the functional insert 40 are provided. Subsequently, the injection-molding of the receiving body 10 and of the functional insert 40 may take place. According to a configuration of the manufacturing method, the receiving body 10 and the functional insert 40 are manufactured out of a high-performance plastic material (see above). However, other plastic materials that are suitable due to their properties may be used. After the injection molding, the receiving body and the functional insert may be demolded.

The invention claimed is:

1. A multipart socket-shaped glue-in retainer which is fastenable in a component opening in an adhesive manner and which is configured in at least two parts due to an axial separation and thus in an opening manner in a radial direction, so that:

only before a gluing-in of the glue-in retainer in a component opening, a functional insert is arrangeable in the glue-in retainer, and after the gluing-in of the glue-in retainer in the component opening, the functional insert is retained inseparably in the glue-in retainer, wherein:

the glue-in retainer includes a hollow-cylindrical receiving body with a circumferential lateral area, a closed axial face side, and an open axial face side with a functional opening which is provided opposite to the closed axial face side, wherein adjacent to the functional opening of the open face side, a circumferentially surrounding fastening collar is arranged, extending radially outwardly with respect to the lateral area of the receiving body so that in use the fastening collar abuts a component surface while the remaining receiving body extends into the component opening, and a circumferentially surrounding web projecting in axial direction is provided at the side of the fastening collar which faces the component so that the web delimits a channel at the component-facing side of the fastening collar in which adhesive is receivable, wherein the fastening collar has a plurality of evenly distributed recesses at its side facing away from the component, wherein within the recesses, the thickness of the fastening collar in the direction of the longitudinal axis is reduced so much that a bottom of the recess is irradiatable with light.

2. The glue-in retainer according to claim 1, the receiving body of which is separated due to at least one axial cut in a longitudinal direction into two parts which are moveable relatively towards each other, wherein the parts are completely or partly releasable from one another.

3. The glue-in retainer according to claim 2, in which connecting surfaces of the parts are provided along the axial cut which are arranged opposite to one another and comprise positioning aids and/or connecting aids of the parts.

4. The glue-in retainer according to claim 2, in which the parts which are arranged adjacent one another are movably connectable with one another via a film hinge and/or a snap-connection and/or plug connection.

5. The glue-in retainer according to claim 1, in which the lateral area comprises an outside which leads or guides the flow and is adapted to a guidance of a flowing adhesive and a functional inside with which the functional insert is retainable in the closed receiving body in a form-fit manner.

6. The glue-in retainer according to claim 5, the functional inside of which includes a circumferential retaining groove which is adapted to receive a circumferential collar of the functional insert in terms of a width and a depth in order to hold the collar firmly or swimmingly/floatingly within the receiving cavity.

7. The glue-in retainer according to claim 1, further comprising a functional insert and the functional insert:

a) is a sleeve being closed on one side and having a circumferential collar and an inner thread or a planar inner wall, b) a spring clip for a quick lock, c) a ball socket with a circumferential collar, or d) a projecting thread pin or a ball bolt.

8. The glue-in retainer according to claim 1, in which the glue-in retainer and/or the functional insert consist(s) of a thermoplastic plastic material with a permanent usage temperature of at least 130° C.

9. A component with a component opening, in which a glue-in retainer according to claim 1 is glued in.

10. An installation method of a glue-in retainer according to claim 1 in a component, comprising the following steps:

a) providing a component with a blind bore hole in which the glue-in retainer is receivable, b) arranging a functional insert in the glue-in retainer so that the functional insert is retained inseparably in the glue-in retainer, and c) gluing-in the glue-in retainer in the blind bore hole by:

d) applying a first adhesive amount to a bottom of the blind bore hole, e) inserting of the glue-in retainer with functional insert into the blind bore hole with the first adhesive amount, and f) curing of the adhesive.

11. The installation method according to claim 10, with the further step:

g) applying a second adhesive amount between the component-facing side of the fastening collar of the glue-in retainer and the component.

12. The installation method according to claim 10, in which the glue-in retainer is fastened with two different adhesives which comply with different curing principles.

13. The glue-in retainer according to claim 1, wherein the glue-in retainer comprises a blocking web within the receiving body at the closed axial face side, wherein the blocking web:

a) is provided at an inside of the closed axial face side, b) projects in axial direction from the inside of the closed axial face side and c) is receivable in a blocking groove of the functional insert so that a relative rotation between the functional insert and the receiving body is prevented.

14. The glue-in retainer according to claim 13, wherein the blocking web is arranged eccentrically with respect to the closed axial face side and extends in radial direction.

15. The glue-in retainer according to claim 1, in which the hollow cylindrical receiving body has an inner thread at a circumferential inner wall in which a wire thread insert is arranged as a functional insert.

* * * * *